US012438737B2

(12) United States Patent
Cambou et al.

(10) Patent No.: US 12,438,737 B2
(45) Date of Patent: Oct. 7, 2025

(54) PROGRAM-READ-ERASE SCHEMES TO PROTECT PUF CHALLENGE-RESPONSE-PAIRS WITH PRE-FORMED ReRAMS

(71) Applicant: Arizona Board of Regents on Behalf of Northern Arizona University, Flagstaff, AZ (US)

(72) Inventors: Bertrand F. Cambou, Flagstaff, AZ (US); Ian Burke, Flagstaff, AZ (US); Taylor Begay, Flagstaff, AZ (US); David Kuan-Yu Liu, Fremont, CA (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 284 days.

(21) Appl. No.: 18/120,745

(22) Filed: Mar. 13, 2023

(65) Prior Publication Data

US 2023/0291581 A1 Sep. 14, 2023

Related U.S. Application Data

(60) Provisional application No. 63/319,153, filed on Mar. 11, 2022.

(51) Int. Cl.
*H04L 9/32* (2006.01)
*G06F 21/60* (2013.01)

(52) U.S. Cl.
CPC .......... *H04L 9/3278* (2013.01); *G06F 21/602* (2013.01)

(58) Field of Classification Search
CPC . H04L 9/3278; H04L 9/0866; H04L 2209/12; G06F 21/602; G06F 21/73
See application file for complete search history.

(56) References Cited

U.S. PATENT DOCUMENTS

| | | | |
|---|---|---|---|
| 10,115,467 B2 | 10/2018 | Liu et al. |
| 10,311,930 B1 | 6/2019 | Kim et al. |
| 10,839,086 B2 | 11/2020 | Gross et al. |
| 11,049,567 B2 | 6/2021 | Peeters |
| 11,231,988 B1 | 1/2022 | Neustrom et al. |
| 11,238,455 B1 | 2/2022 | Daniyalzade et al. |
| 11,240,006 B2 | 2/2022 | Mondello et al. |
| 11,240,023 B1 | 2/2022 | Donlan et al. |

(Continued)

OTHER PUBLICATIONS

Skaja, Katharina, et al. "Reduction of the forming voltage through tailored oxygen non-stoichiometry in tantalum oxide ReRAM devices." Scientific reports 8.1 (2018): 10861. (Year: 2018).*

*Primary Examiner* — Sangseok Park
(74) *Attorney, Agent, or Firm* — Quarles & Brady LLP

(57) ABSTRACT

Arrangements and methods for a program-read-erase memory using ReRAM cells is disclosed. The memory includes an array of pristine ReRAM cells. A first digital symbol is encoded in the memory by partially forming cells, while the opposite digital value is encoded in pristine cells. As part of a read process, all cells are subject to partial formation voltage which erases all data as it is being read. ReRAM memories used in this manner are advantageously usable to store challenges for interrogating PUFs for recovery of PUF-generated encryption keys.

19 Claims, 12 Drawing Sheets

(56) References Cited

U.S. PATENT DOCUMENTS

| | | | | |
|---|---|---|---|---|
| 2004/0190722 | A1* | 9/2004 | Grobman | H04L 9/0897 |
| | | | | 380/284 |
| 2016/0364583 | A1* | 12/2016 | Benoit | H04L 9/3278 |
| 2019/0342106 | A1* | 11/2019 | Li | G11C 7/24 |
| 2020/0014547 | A1* | 1/2020 | Lu | H03K 3/84 |
| 2020/0097209 | A1* | 3/2020 | Zhou | G06F 3/064 |
| 2020/0396069 | A1* | 12/2020 | Kwak | H04L 9/0866 |
| 2022/0044727 | A1 | 2/2022 | Cambou et al. | |
| 2022/0045996 | A1 | 2/2022 | Cambou | |
| 2022/0417043 | A1 | 12/2022 | Cambou et al. | |

* cited by examiner

PROGRAM-READ-ERASE SCHEMES TO PROTECT PUF CHALLENGE-RESPONSE-PAIRS WITH PRE-FORMED ReRAMS

CROSS-REFERENCE TO RELATED APPLICATIONS

This application claims priority to U.S. Provisional Patent Application No. 63/319,153, filed under the same title on Mar. 11, 2022, the entire contents of which are incorporated by reference herein for all purposes.

STATEMENT OF FEDERALLY SPONSORED RESEARCH OR DEVELOPMENT

Not applicable.

BACKGROUND

Information is frequently encrypted to protect against eavesdropping and unauthorized access using encryption schemes based on the use of one or more encryption keys and other keyless encryption schemes. Encryption schemes are frequently used in conjunction with authentication schemes to improve the security of electronic systems. PUF-based security systems use a PUF device as an "electronic fingerprint" unique to a user or device in possession or control of the PUF device, allowing an authentication system to challenge a client seeking authentication, receive a response generated by the client using a PUF device, and then compare the received with a stored response previously received from the client or derived from characteristics of the PUF device and verifying that the two responses match. PUF devices may also be used to generate encryption keys for use with various encryption schemes, including symmetric and asymmetric schemes. A client device may be called on to store sensitive information usable for key generation, which information should be stored in a secure, tamper evident manner.

BRIEF SUMMARY

Embodiments of the invention are directed to methods and systems for providing for secure encrypted communications between two devices, for example, a server side device and a client side device. The client side device is in electronic communication with, and preferably includes, an addressable array of PUF devices. In one example, the PUF devices in the array are pristine or pre-formed ReRAM elements that have not been subject to a forming cycle. The PUF devices each have a unique physical response characteristic in response to stimulus. In the case of a pristine ReRAM array, for example, each array element will display unique (or nearly unique) I-V characteristics, and specifically, will demonstrate resistance as a function of injected current that is unique to that device. Additionally, the variation in device to device resistance of pristine Re-RAMs is quite high. Relying on these properties, in certain embodiments, a client with an addressable array of pristine ReRAM devices receives challenge instructions identifying a set of individual PUF device's in the client's array. A physical property of those identified devices is measured, which may be a resistance in response to a low-level probe current. The resulting resistance values are used as or as the basis for the generation of an encryption key. The key is used by the client for encrypting digital documents, decrypting documents encrypted with a previous version of the same key and in carrying on encrypted communication.

In certain embodiments, a matching key is generated at the server side to enable secure, encrypted communications with the client. According to certain of these embodiments, data about the responses of the client's PUF devices under predetermined stimulus (e.g., injected current for the PUF ReRAM elements) is generated and stored at the server. This generally occurs during an enrollment process, while the client and its PUF array in a secure environment before deployment. The result of this measurement process is a comprehensive model of the responses client device's PUF devices under a range of measurement conditions. The resulting database of responses is referred to herein as an "image".

At a high level, inventive methods and arrangements of certain embodiments allow for secure communication between two computing devices, such as a client and a server. According to these embodiments, a server a subset of addresses corresponding to PUF devices at the client, and optionally measurement conditions. The server retrieves previously measured responses for the identified devices from the image and then builds a server-side key on the basis of the determined response values. The server passes a message to the client sufficient to enable the client to determine the identities of the same selected PUF devices and the conditions under which their physical response is to be measured. The client then runs the measurement on the selected devices, and uses the responses to generate the client side key. This server-client key pair may then be used according to conventional methods to effect communication between the two devices. In certain arrangements, the client's key is also used to encrypt digital files for storage and later retrieval with a later-generated version of the same key. In these cases, the key is preferably deleted and the challenge instructions, which were originally encoded in the message received from the server, are stored. These challenge instructions are sufficient to re-generate the key with a new set of PUF measurements.

In the method just described, a server device passes to a client device a message from which the client device may determine the addresses of devices to be measured. At a basic level, this message could simply be a list of addresses, but in other cases, the server may pass instructions enabling the client to generate a list of addresses itself. Additionally, the message may include information enabling the server to determine measurement conditions. For example, in the case where the client PUF is a ReRAM array, the measurement conditions may include a probe current value for which a resistance value (reflecting a previous measurement) is recorded in the server's PUF image. Additionally, the server may pass information that may help to reduce errors that may occur due to drift in the response of the client-PUF, PUF devices that are unstable or erratic, or measurement errors. This additional information may include error correction codes, or blanking instructions usable to identify the location of cells having an erratic response within the client PUF.

In the general scheme described above, the client device may be required to store certain information received from the server. For example, if the arrangement just described is used by a server-client device pair to generate time-limited session keys, the client may receive and store a series of messages of the sort just described, which it may use to generate a series of session keys over time. In such arrangement, a client device may store challenge instructions (i.e., instructions identifying cells to be measured and measurement conditions), information identifying unstable cells that are to be blanked or ignored, helper or error correction data, and other parameters. Although not preferred, the client device may also store an encryption key once generated. It would be advantageous to provide for storage of some or all of this data in secure, tamper-proof or tamper evident way.

In certain embodiments, the client's PUF is an addressable array of pristine random access memory elements (ReRAMs). In these embodiments, the client uses a portion of its array of pristine ReRAM devices for secure data storage. In alternative embodiments, the client uses a separate array of pristine ReRAMs as a secure memory, and these cases, the PUF may be any device usable as a PUF. In the foregoing embodiments, digital data is encoded onto ReRAM devices by subjecting certain of the devices to a partial forming cycle, which occurs through the application of a voltage sufficient to form permanent, but incomplete, conductive filaments in the dielectric layers of the ReRAM cells. This partial-forming process involves ramping voltage across the cells to a peak beyond the breakdown voltage of the cell, but short of the peak voltage used in a conventional ReRAM forming process, where conductive filaments would be fully formed. A partial forming cycle lowers the resistance of cells subjected to it considerably from the pristine state, but it does not lower the resistance to the value characteristic of fully formed devices. This lowered resistance state is usable to encode a first digital value, and the resistance of pristine cells encodes the opposite digital value. Thus, certain embodiments provide a memory device realized in an array of ReRAM cells where a first binary value is encoded in partially formed devices, and a second binary value is encoded in pristine devices.

In some embodiments, a client's array of pristine ReRAM devices is bifurcated or otherwise segmented such that a first set of devices in the array is dedicated for use as a PUF, and a second and/or additional sets of devices in the array are dedicated for use as memory. In these cases, the portion of the pristine ReRAM array that is dedicated for use as a PUF (i.e., for the generation of PUF responses) remains pristine, while the portion or portions dedicated for use as memory will have certain cells subject to a partial forming cycle as digital data is written to those cells. The memory may be used to store sensitive information, such challenge instructions received from the server usable to generate PUF responses and conduct key generation. The memory may also be used for storage of digital files previously encrypted with a previous version of the key.

In alternative embodiments, the pristine ReRAM based memory is read in such away so as to destroy the data encoded therein. In these embodiments, to read the data, all of the devices being used for storage are subjected to a partial forming cycle while the varying resistance of all of the devices during this process is differentially determined to read binary values. That is to say, the read cycle is conducted in such a way so as to determine which cells had already been subject to partial formation at the start of the read process (and therefore had lower resistance) and which devices were still pristine at the start of the read process (and therefore had higher resistance). At the end of a read cycle, devices that had low resistance at the beginning of the read cycle are read as one digital value, and devices that had high resistance (i.e., were pristine) at the beginning of the read cycle are read as the opposite digital value. The determination may be made by measuring the charge accumulated by a capacitor in arranged in parallel with a ReRAM as it is being subject to a partial forming cycle. At the end of this read process, all of the read cells are in a partially formed state, and the originally stored data cannot be recovered, making these one-time read devices. In alternative embodiments, the read cycle subjects the memory devices to a full, conventional ReRAM forming process rather than a partial forming process.

In a first embodiment, a method of managing storage of a first digital file in a client device is provided. The client device has an addressable array of physical unclonable function devices ("PUF array"). The method includes the steps of receiving a challenge message comprising information identifying a set of devices in the PUF array. The method involves measuring a physical characteristic of at least some of the devices identified in the challenge message resulting in a set of PUF responses. The PUF responses are then used to encrypt a digital file. The digital file is stored in a first array of ReRAM devices, at least some of which have been subject to a partial forming cycle. The challenge message or challenge instructions may also be stored in this memory. This memory encodes a first digital value in partially formed ReRAM cells, and a second digital value in pristine ReRAM cells. The PUF array may also be a pristine ReRAM array. In certain embodiments, the ReRAM memory may be a sector, bifurcation or subdivision of the ReRAM PUF array.

In another embodiment, an electronic memory device is provided. The electronic memory device includes an array of addressable ReRAM devices encoding a first digital value in a set of partially formed devices and a second digital value in a set of pristine devices. The partially formed devices having been subject to a partial forming cycle comprising ramping a voltage across a plurality of devices sufficient to create permanent, but discontinuous conductive filament formation sufficient to lower the resistance of such devices from a first resistance value to a second resistance of value of below 500 KΩ when measured with a probe current having a value within the range of 1 nanoamp to 1 microamp.

Embodiments of the invention have certain advantages. In the inventive embodiments, a single, integrated array of ReRAM PUF devices may be used both for response-key generation and for secure storage of challenge messages and encrypted files. This provides for a single integrated device, where challenge messages are being retrieved from and applied within the same array of ReRAM devices, which enhances security. Additionally, read circuitry may be configured to add an additional layer of security by configuring the ReRAM memory as one-time-read memory, where the sensitive information stored thereon is destroyed as it is read. Additional advantages will become clear upon consideration of the following detailed description.

BRIEF DESCRIPTION OF THE DRAWINGS

The drawings described herein constitute part of this specification and includes exemplary embodiments of the present invention which may be embodied in various forms. It is to be understood that in some instances, various aspects of the invention may be shown exaggerated or enlarged to facilitate an understanding of the invention. Therefore, drawings may not be to scale.

DETAILED DESCRIPTION

Figure 1:
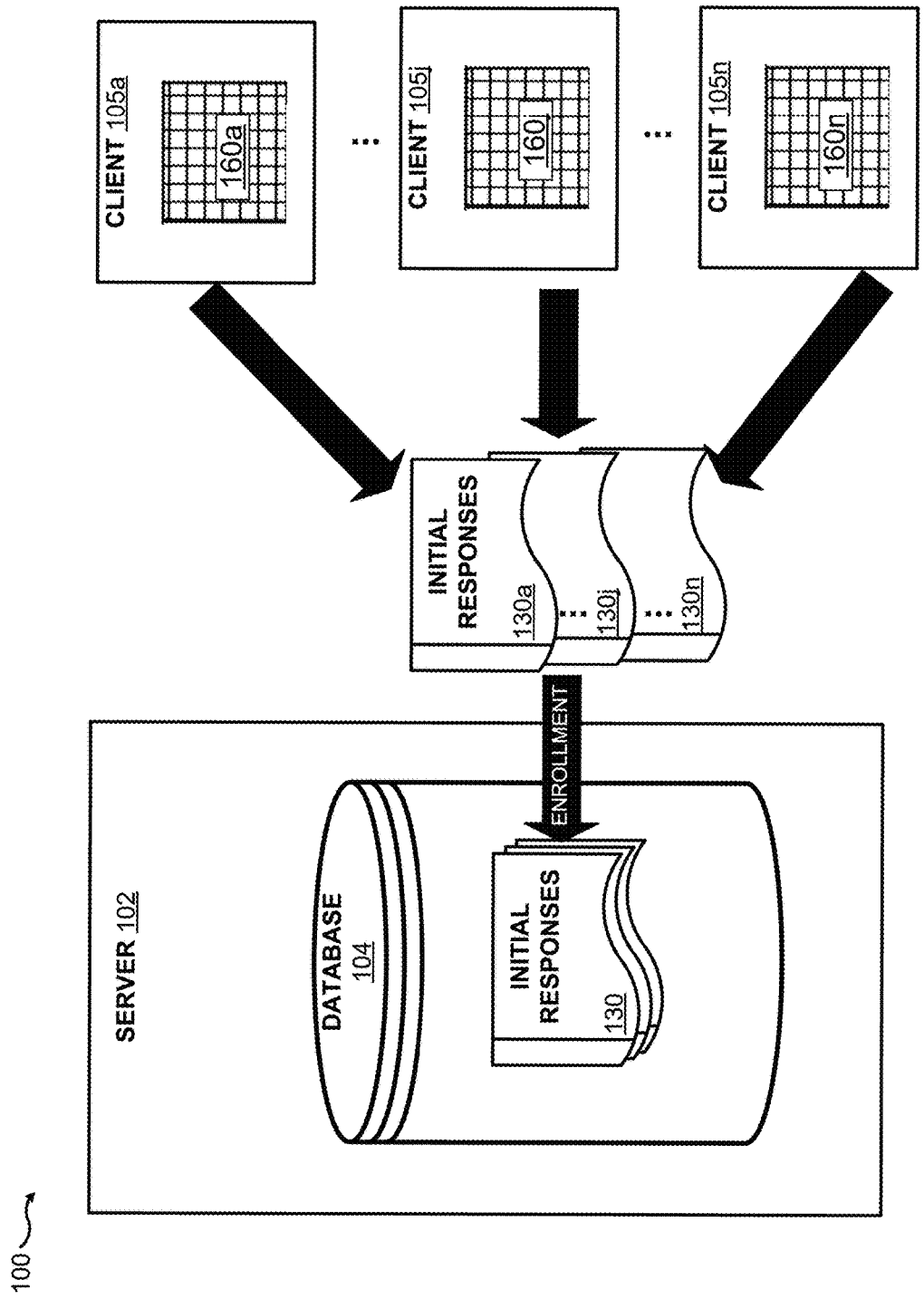
FIG. 1 depicts an enrollment procedure wherein a server issues challenges to clients having PUF arrays and stores responses to those challenges for use in subsequent authentication of the clients, according to one embodiment.

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment. References to "users" or a "client" refer generally to individuals accessing a particular computing device or resource, to an external computing device accessing a particular computing device or resource, or to various processes executing in any combination of hardware, software, or firmware that access a particular computing device or resource. Similarly, references to a "server" refer generally to a computing device acting as a server, or processes executing in any combination of hardware, software, or firmware that access control access to a particular computing device or resource. As used herein, both a client and server refer to computing devices having at least a programmable processor in communication with non-volatile memory having stored therein computer readable and computer executable instructions operable to cause the processor to execute instructions corresponding to the method and process steps described in this disclosure. Clients and servers may also have additional components of conventional computing devices, as discussed below.

Conventional systems and methods for secure communication frequently rely upon encryption of messages using encryption keys which may be symmetrical or asymmetrical (e.g., in public key encryption schemes). Such key-based encryption schemes have disadvantages. First, keys must be generated and stored by various parties, introducing the possibility that the keys may be compromised by a malicious party. Additionally, key-based encryption schemes may be vulnerable to brute force attacks wherein a malicious party may discover the key given access to a message encrypted with that key.

Accordingly, embodiments disclosed herein address these and other shortcomings by using physical unclonable function (PUF) generators (APGs) to implement encryption schemes where a client with an APG and a server with knowledge of device characteristics of the APG communicate using a shared cryptographic key that is independently generated by both parties, eliminating the need for key exchanges. Such methods are secure, in part, because only a device in possession of the correct PUF array or characteristics of that PUF array (i.e., the client or the server) can identify the correct encryption key.

In the context of this disclosure, a challenge is any information transmitted to an APG to cause production of an expected response corresponding to that information. Along these lines, a challenge may be input supplied to an APG which is used to produce a response having one or more expected values which depend upon characteristics' of the PUF array belonging to the APG to which the challenge is issued. The appropriate challenge response may be derived from those characteristics using instructions stored by the APG or other processing circuitry, received by the APG or other processing circuitry and/or additional information supplied to the APG or other processing circuitry (such as a password of a user). In one simple non-limiting example, a challenge might simply be instructions directing the APG to return the values stored by devices of a PUF array at a specified address or set or sequence of addresses. In other non-limiting examples, a challenge might include instructions to perform a mathematical, logical, or other operation (s) on those values. In other examples, a response may be a measurable physical characteristic of a device in the PUF array.

In some examples, additional information may be included with or otherwise associated with a challenge. For example, a server may send the error-correction information to a client for use in making generation of the responses more reliable. The instructions may include error correction instructions (sometimes called a "helper" or "helper instructions") and/or masking instructions. Error correction instructions may include a checksum or other error-correcting information for use with error-correcting codes, or other information or instructions used in response generation schemes to be discussed later below. Masking instructions may instruct the client to exclude cells which were previously characterized as unreliable or erratic cells when the PUF array was previously measured during enrollment. Using these additional instructions, the client may generate corrected responses which simply exclude measurements of the unreliable cells and/or substitute other cells. Alternatively the client may measure additional cells to ensure that the corrected responses are of a specified length. The client may store instructions for selecting the additional cells to measure, or may receive such instructions as part of the error-correction information.

Non-limiting examples of measurable physical characteristics of devices used in PUF arrays that may be or be the basis of responses include time delays of transistor-based ring oscillators and transistor threshold voltages. Additional examples include data stored in SRAM or information derived from such data. For instance, in a PUF array based on SRAM cells, an example of such physical characteristics may be the effective stored data values of individual SRAM devices (i.e., '0' or '1') after being subjected to a power-off/power-on cycle. Because the initial state (or other characteristics) of an individual PUF device may not be perfectly deterministic, statistics produced by repeated measurements of a device may be used instead of single measurements. In the example of an SRAM-based PUF device, the device could be power-cycled 100 times and the frequency of the '0' or '1' state could be used as a characteristic of that device. Other non-limiting examples of suitable characteristics include optical measurements, such as filtering characteristics, wavelength shifting or reflectivity. For instance, a PUF device may be an optical PUF device which, when illuminated by a light source such as a laser, produces a unique image. This image may be digitized and the pixels may be used as an addressable PUF array. A good PUF should be unpredictable (meaning, one cannot predict the exact value of a response analytically, without measurement) but stable and repeatable, such that subsequent responses to the same challenge should be similar to each other (and preferably identical).

Additional non-limiting examples of measurable physical characteristics of devices used in PUF arrays which are specifically applicable to embodiments herein are currents induced by an applied input voltage or current, or voltages of various circuit elements that may be measured during operation of a PUF device in response to another stimulus. Further non-limiting examples may include derived quantities such as resistance, conductance, capacitance, inductance, and so on. In certain embodiments, such characteristics of a device may be functions of an input or stimulus level of the device. For example, current-voltage characteristics of ReRAM memristors and other devices may be non-linear. Thus, the measured resistance of a ReRAM cell will depend on a current or voltage level applied during the measurement process. Thus the relationship between applied current and voltage measured across a memristor (or between applied voltage and current measured through the memristor) is one example of a non-linear transfer function which can be exploited to produce multiple discrete or continuous characteristic values using a single PUF device. Indeed, because the I-V characteristics of memristors are non-linear, a ReRAM array provides a near infinite space of discrete, but repeatable, physical characteristic measurements that can form the basis of the key generation techniques described herein.

According to various embodiments, an encryption protocol enabled by PUFs includes the following stages: (1) Enrollment, (2) Handshaking, (3) Ciphertext generation, and (4) Ciphertext Decryption. These stages are described below, beginning with reference to FIG. 1 illustrating an example environment 100 in which embodiments disclosed herein may be practiced. The environment 100 includes a server 102 and client devices, hereinafter clients 105 (represented by clients 105a, 105j, and 105n). The server 102 manages a database 104 which may be stored in memory of the server 102. The database 104 stores characteristics of the PUF arrays 160 of each client (i.e., "images" of each PUF array 160), which may be generated in response to challenges issued by the server 102 to the clients 105, each of which may respond to the challenges by accessing a respective PUF array 160 represented by the PUF arrays 160a, 160j, and 160n belonging to clients 105a, 105j, and 105n. Alternatively, the server 102 may be otherwise provided with information suitable to generate the initial challenge responses 130.

A PUF array 160 may form parts of an addressable PUF generator (APG), described further below, which may contain additional storage, processing circuitry and may execute instructions for generating challenge responses. Enrollment is performed for each client 105 in a secure environment. After enrollment, the constellation of clients 105 may operate in an insecure environment and communicate with each other over public networks. Secure information needs to be encrypted.

Figure 2:
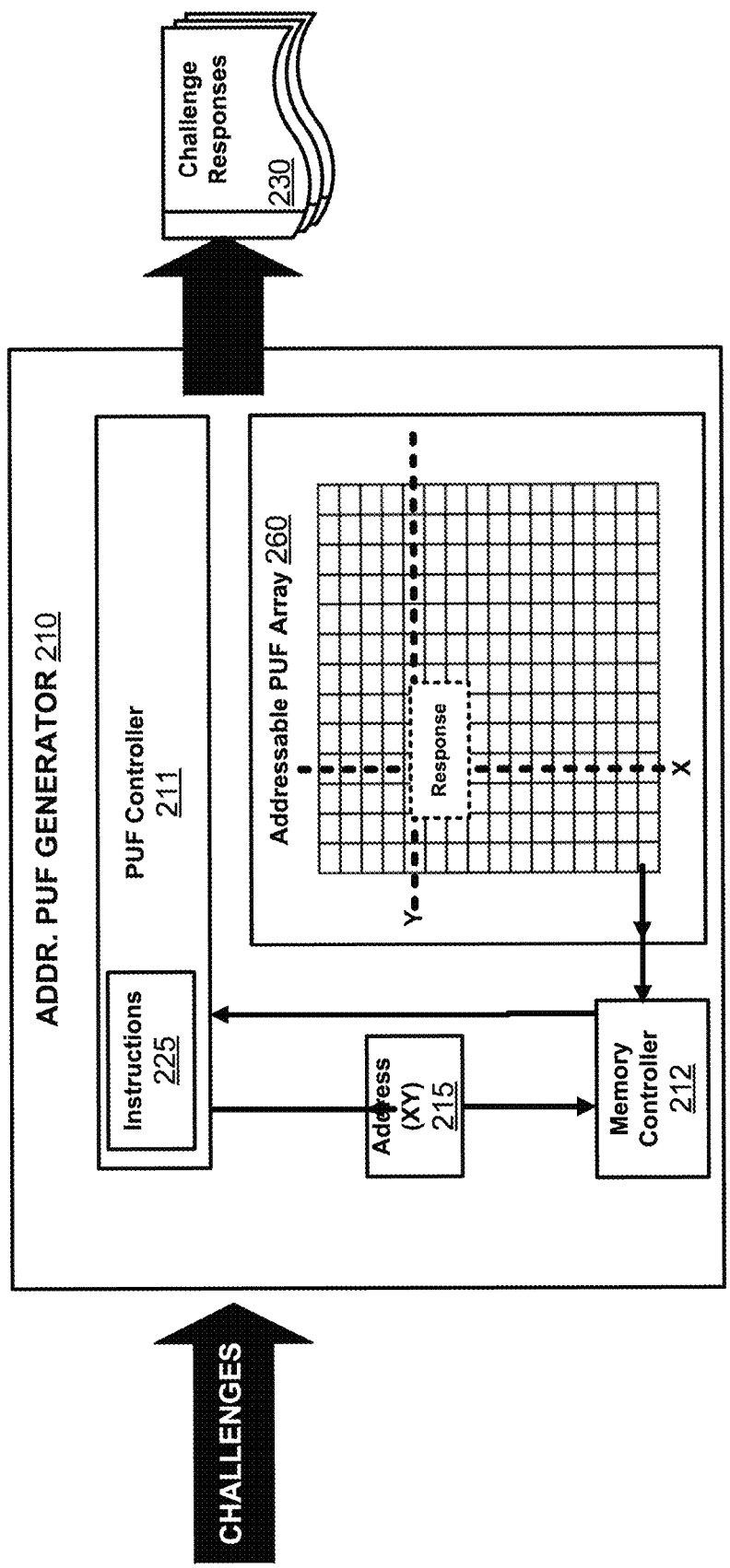
FIG. 2 is a block diagram of an addressable PUF generator (APG).

FIG. 2 illustrates features of an example APG 210 that controls a PUF array 260 (e.g., a PUF array 160) to generate challenge responses (e.g., responses 130). The APG 210 has a PUF controller 211 that implements instructions 225. The read/write circuit elements illustrated herein in connection with FIGS. 7 and 9-11 may also be included in an APG for the client devices described below. The instructions 225 may be stored in memory accessible to the PUF controller 211 and/or received from another device. In preferred embodiments, this memory is a secure, tamper resistant memory realized by writing data to a pristine ReRAM array as described below in connection with FIGS. 7 and 9. In some embodiments, portions of the instructions 225 may be pre-configured and other portions of the instructions 225 may be received or retrieved on an as-needed basis. Using the instructions 225, the APG 210 is configured to receive challenges and generate challenge response 230 (e.g., the initial responses 130) using the PUF controller 211 and the instructions 225. In response to receiving a challenge, the APG 210 generates an address (or range of addresses) 215 that identify one or more devices in the PUF array 260 using the instructions 225. The PUF array 260 may be arranged and addressed as a 2D array of cells, as shown, or in any other suitable manner. The PUF devices identified by the address 215 may be accessed via a memory controller 212 and characteristics of those devices may be measured. Using values of the measured device characteristics, the PUF controller may use the instructions 225 to generate an appropriate challenge response 230. Although the APG 210 is depicted as a standalone device, it will be appreciated that an APG may be formed by any suitable arrangement of components configured to perform processes described herein.

PUFs can offer additional layers of protection because the cryptographic keys are not stored in a database, but rather, are generated on the fly, for example, by the client, which is in possession of the PUF/APG. When a system leverages PUF technology, a third party cannot simultaneously have access to the encrypted files and the cryptographic key by directly reading the information stored in the terminal device. The opponent needs to have access to the challenges of the PUF, and in some cases other instructions, and must also be able to measure the PUF to generate the responses of the PUF and uncover the keys. The schemes presented in this disclosure allow the permanent erasing of both the challenges and other instructions after the uncovering of the cryptographic keys.

Figure 3:
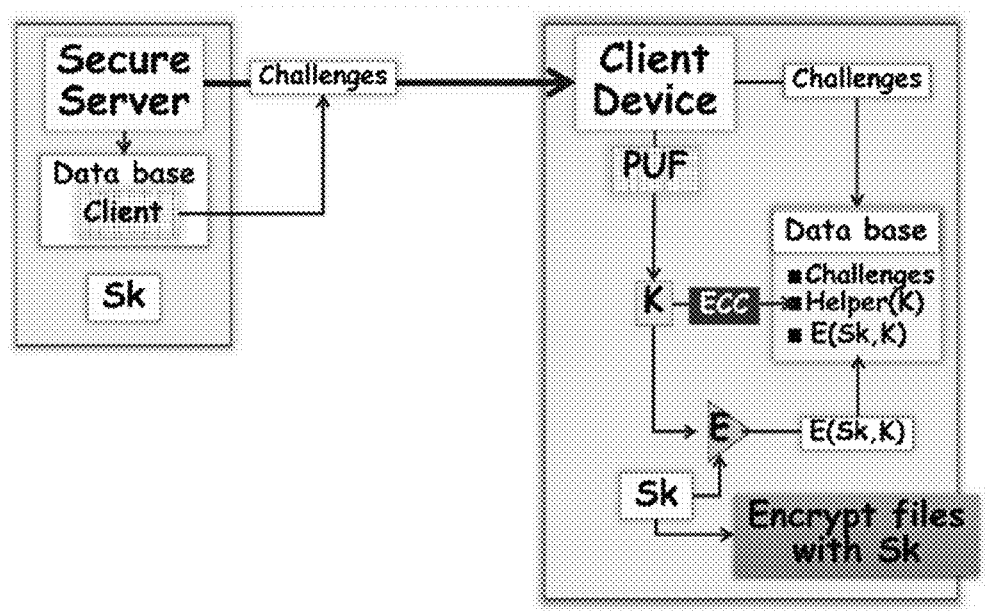
FIG. 3 depicts an arrangement and method for an encryption cycle at a client initiated by a server.

The PUF-based encryption and authentication principles described above may be extended to allow a client device to securely store digital files. While the applicability of the schemes that will be described are not limited to a particular example of a PUF-based protocol, an example method to encrypt digital files with a PUF is summarized in FIG. 3. In the arrangement of FIG. 3, a server is provided. The server is preferably in a secure environment. The server, like the servers and clients discussed in reference to FIGS. 1 and 2, may have the elements typical of a conventional computing device, including a programmable processor, storage, including non-volatile storage, and data input/out and display devices such as network interfaces, keyboards, visual displays, speakers, tactile input devices, etc. The storage will typically store computer executable instructions that when executed by a programmable processor cause the processor to perform the various method steps described below. The arrangement of FIG. 3 also includes one or more client devices, which again may be a conventional computing device having the elements and properties just listed. In addition to conventional components, client includes a PUF and associated read/write circuitry (e.g., an APG). Additionally, in optional embodiments, the server includes a pristine ReRAM-based memory and associated read and write electronics as is described below.

According to the encryption protocol illustrated in FIG. 3, the server generates challenge instructions including challenges usable to identify the location of individual PUF devices within a PUF array housed at client. The challenge instructions may also include, or be transmitted with, additional information, such as measurement conditions for the identified PUF devices, blanking instructions for previously identified unstable PUF devices, and helper instructions, to enable the client to correct contemporaneously measured PUF responses such that they match previously measured responses. The server transmits the challenge instructions in a challenge message to the client. In preferred embodiments, the challenge instructions are generated by the server using a random process, e.g., by generating a random number with a random number generator or pseudorandom number generator, and then processing or parsing the random number to define, at least, a list of device addresses in the client's addressable PUF array. The processing may include hashing, chunking and hashing, sequential XORing of adjacent bits, or other processes to further add entropy to the challenge generation process. The server may take other inputs and use them as part of the challenge generation process, such as user IDs, user passwords, or time stamps.

In optional embodiments, server also includes in its memory a database encoding an image of the client's PUF, i.e., a table including previously measured responses of physical device characteristics or responses for all of the client's PUF's devices. The server database may also include other related information, such as masking information for erratic cells in the client's PUF. The server may also optionally store one or more session keys Sk to be used for encrypted communication with the client. Session keys Sk may be time limited encryption/decryption keys that may be used according to any encryption algorithm (e.g., a symmetrical encryption algorithm) to encrypt messages sent to the client and decrypt messages received from the client during the authorized time period when the session key is active. The server session key and the client session key may also be used to authenticate the communication channel between the devices by some comparison or matching method operable to compare the server and client session keys to confirm that they match. For example, the client may periodically hash a session key, or hash a shared piece of data (e.g., a user ID) with a session key, and send the hashed message to the server, where it may be compared with the same information computed on the server side with the sider's copy of the session key.

The session key itself Sk may be generated by reading a binary data stream of previously measured PUF responses from a PUF image at the server database, in cases where the server has such an image. Methods for generating encryption keys with PUFs and their images, and for carrying out secure communications with those keys, are discussed above in relation to FIGS. 1-2, and are further are disclosed in, for example, co-owned U.S. Patent Publication Ser. Nos. 2022/019759 and 2022/0045996 which are incorporated herein by reference in their entirety. The methods discussed in those applications are fully applicable to the methods and systems discussed herein for the purpose of key generation and use, but the secure storage methods and arrangements to be discussed do not depend on any particular method of session key generation. That is to say, the storage arrangements and methodologies discussed below do not require that session keys be generated in any particular way.

Client device 310 receives the challenge instructions generated by the server, and on the basis of the challenge instructions, identifies the PUF devices to be measured, as well as any measurement conditions dictated by the challenge message. Measurement conditions where the client's PUF is an array of pristine ReRAM elements may be probe current values at which resistance is to measured or calculated (e.g., on the basis of measured voltage). The same probe current value is preferably specified for all elements to be measured, but this is not a required—different probe currents for different devices may also be specified. The probe current used to generate responses in the ReRAM PUF is such that the voltage across the cell at the probe current value is insufficient to generate a breakdown voltage across the cell such that permanent conductive filaments begin to form. Applicants have determined that acceptable probe current values for commercially available ReRAM devices are on the order of 100 nA, but a range of values is acceptable and within the scope of the invention. Probe currents that are within the range of 1 nA to 1 micro amp are acceptable, as well as probe currents beyond this range, depending on the configuration of the ReRAM devices being used. The resistances of identified client PUF devices are then measured at a predetermined probe current, and that process generates first response stream K. Response stream K, acts as, or is used by the client as an encryption key to encrypt a client copy of session key Sk so that Sk may be securely stored for future use. The response bitstream itself may serve as an encryption key, or the response bitstream may be used as or as the basis of an input or seed to a key generating algorithm to generate the key. Again, the session key Sk itself may also be generated from client PUF responses pursuant to a similar process, but this is not a requirement.

According to the methods described herein, the response stream K will be generated again in the future in order for recovery of the encrypted session key Sk so that, for example, any stored files that were encrypted with the session key can be decrypted. This raises the concern of instability in the PUF potentially causing the PUF returning a different response stream in the future in response to the same challenge message. Because PUFs are physical elements, they will likely be subject to environmental drifts and aging. This means that a second response stream K' that is measured by the client APG for decryption may not be the same initial response stream that was initially measured when a first iteration of K was generated. Thus, there may be some mismatch between a first measured K response and a second measured K' response stream. Because the response bitstream, after initially being generated, is used to encrypt the session key Sk, if a second attempt to measure K does not return the same values, the client will be unable to recover Sk unless the second response bitstream is corrected such that it matches the first bitstream.

Various error correcting schemes can be used to guarantee that both a first and a second measurements of the response bitstream are a match. For example, when the client initially measures K it may also generate and store helper instructions ("Helpers" in FIG. 3) that are usable to correct errors in a subsequent measurement of K'. Helper instructions may include a checksum or hash of the initial K bitstream. During a subsequent measurement, the client can hash or compute the checksum of the second measurement (K'), compare to the hash or checksum of the first measurement (K), and then iteratively flip bits in K' until the hash or checksums match. These processes may be performed piecewise, on chunks of K and K' to improve latency. Generally speaking, the helper instructions may allow the client to correct the second response to compensate for errors introduced by drift mechanisms like temperature difference. Suitable error correction methods and the use of helper data are disclosed in co-owned U.S. Patent Publication No. 2022/0417043, which again, is incorporated herein by reference in its entirety.

In embodiments where helper data or error correction codes are calculated for the initial measurement of K, those helpers "Helpers(k)" are stored in storage at the client in the client's database. The initial challenge instructions ("Challenges") are also stored.

Another issue that may arise is erratic or unstable cells. In the case of ReRAM cells, the "response" of the cell may be a resistance value which is assigned to a binary value by comparison to some reference value. The reference value may be, for example, the median resistance value of all cells in the PUF at the relevant measurement current, or the median resistance value for all cells in the key (i.e., all cells identified by the challenge message), or even all cells in the PUF. Cell response may be encoded by categorizing all cells having a resistance above the reference value as 1s, and all cells measuring below the reference as 0s, or vice versa. This may be done by deriving a voltage from the resistance value of measured cells, and comparing the measured voltage to a reference voltage (corresponding to a reference resistance) in a comparator circuit. A potential problem arises with cells that tend to measure close to the reference value, or cells that are erratic or unstable. During an initial generation of K, those cells may be measured as one value, but during later measurement by the client, their resistance may drift enough, or variations in the measurement circuitry may be such that they measure as the other value. The result of this, if not dealt with, would be a second K' measurement that does not match the first K measurement.

To address this problem of unstable cells (e.g., cells with resistances close to a threshold, such as the median resistance of all cells), unstable or "fuzzy" cells may assigned a ternary state and be removed from inclusion in versions of K used to encrypt Sk. Such cells may be identified by the client when K is being initially measured. One method of blanking fuzzy cells would be to measure the response of all cells, determine the median, apply a threshold around the median having an upper and lower bound, and then exclude all cells within the upper and lower bound from inclusion in K. These same cells would be excluded from K'.

Alternatively, erratic cells may be identified during a PUF enrollment process of the sort described above in reference to FIGS. 1 and 2. In these cases, the erratic or unstable cells are identified and data identifying such cells are stored at the server. Identification of unstable cells is made possible by multiple measurement of each cell during enrollment. Under such a method, the server would exclude cells previously determined to be unstable from being identified in the challenge message, and so the client would never be called upon to generate responses corresponding to the blanked cells, and such cells would be excluded from the server's generated K. In alternative embodiments, the server may initially include the fuzzy cells in the challenge message, but may also send blanking instructions or a mask to the client causing the client to blank or ignore the response of fuzzy cells.

Referring still to the encryption cycle depicted in FIG. 3, optional embodiments may handle the generation of helper data and masking of erratic cells differently. In some cases the server should be able to decrypt the session key encrypted with a set of PUF responses, or otherwise recover the session key. In these cases, all subsequent versions of K (which will be used to encrypt and decrypt the client copy of the session key) should match the version of K that is generated by server. This is the version that results from interrogating the PUF image stored on the server. In these cases, helper data should be computed on the basis of the response stream retrieved by the server from its PUF image, so that the client can correct its measurements of the response bitstream back to the server version. Thus, in these cases, the server will pass the helper data to the client as part of the challenge message. The helper data will then be stored by the client in its database as illustrated in FIG. 3. Preferably, the server also computes the mask for erratic cells, because this process is best done through repeated PUF device measurements, and is best done during enrollment. In these cases too, the mask is passed to the client as part of the challenge message and is stored.

In other cases, the server may have no need to store an encrypted version of the session key. Because the server may be in a secure environment, in some cases, the server may store the session key without it being encrypted. In these cases, the client need only correct subsequent sets of responses back to the initial response stream used to encrypt the client's encryption session key. Thus, in these embodiments, the client will receive a challenge message (e.g., PUF addresses) from the server, or generate them itself, and then will measure an initial response stream K. The client will then calculate its own helper data from the initial response stream K (e.g., a hash, some other token generated by a one-way cryptographic function, a checksum, etc.), and that helper data will be stored. In these cases masking data for unstable cells is still preferably generated by the server and sent to the client for storage. However, this is not a requirement. The client can also, in certain cases, identify erratic cells itself. This can be done by the processes discussed above for this purpose, e.g., making multiple measurements of each device to detect variance, or measuring multiple cells to find a mean or median resistance to which to compare the resistance values in the response stream. This method is not preferred, however, for reasons of security—the client should not generally store large amounts of data characterizing PUF responses.

Returning to FIG. 3 after K has been generated, the client computes helper data and stores the helper data in memory. Alternatively, the client may receive helper data from the server, and use that helper data to correct K back to a version of K that would be generated from the server's PUF image on the basis of the challenges. Additionally, as another optional step, the client applies masking data, which may be self-generated or received from the server, to blank or filter unstable cells and exclude the responses from such cells from being used to encrypt Sk, as discussed below. Once the responses from erratic cells have been excluded, K is used as or as the basis of an encryption key (e.g., as a seed value for a key generation algorithm). That key is used as a cryptographic key to encrypt the session key Sk resulting in cipher text E(Sk,K). The method is not limited in the type of encryption algorithm usable to encrypt Sk with K. Symmetrical encryption codes such as AES or DES can be applied for this operation. The client may also encrypt other files (i.e., digital files or digital documents) with Sk, which may be stored for future use, or transmitted to other devices in possession of or capable of generating Sk (e.g., the server). The client device may store the files encrypted with Sk, along with the challenges K, the data helper, masking data and the cipher text E(Sk,K). Preferably, once ciphertext E(Sk, K) is generated, Sk is deleted.

It will be appreciated that a third party who gains access to the client's database will have access to the challenge message, the helper data/masking data and the ciphertext E(Sk, K) (i.e., Sk having been encrypted with the PUF responses corresponding to the challenges in the challenge message). However, such a third party cannot find Sk without having access to the PUF (i.e., without the ability to generate K).

As is suggested above, in some embodiments, the server is involved in the challenge generation of the PUF. Such an optional scheme is valuable when an initial enrollment cycle detects the portions of the PUF that should be avoided because they are unstable and erratic. The challenges can then avoid these portions which results in lower bit error rates (BERs). An alternate scheme maps of the erratic portions of the PUF which is stored in the terminal device. In further alternative embodiments, the server does not generate K, but rather K is generated by the client device itself.

Figure 4:
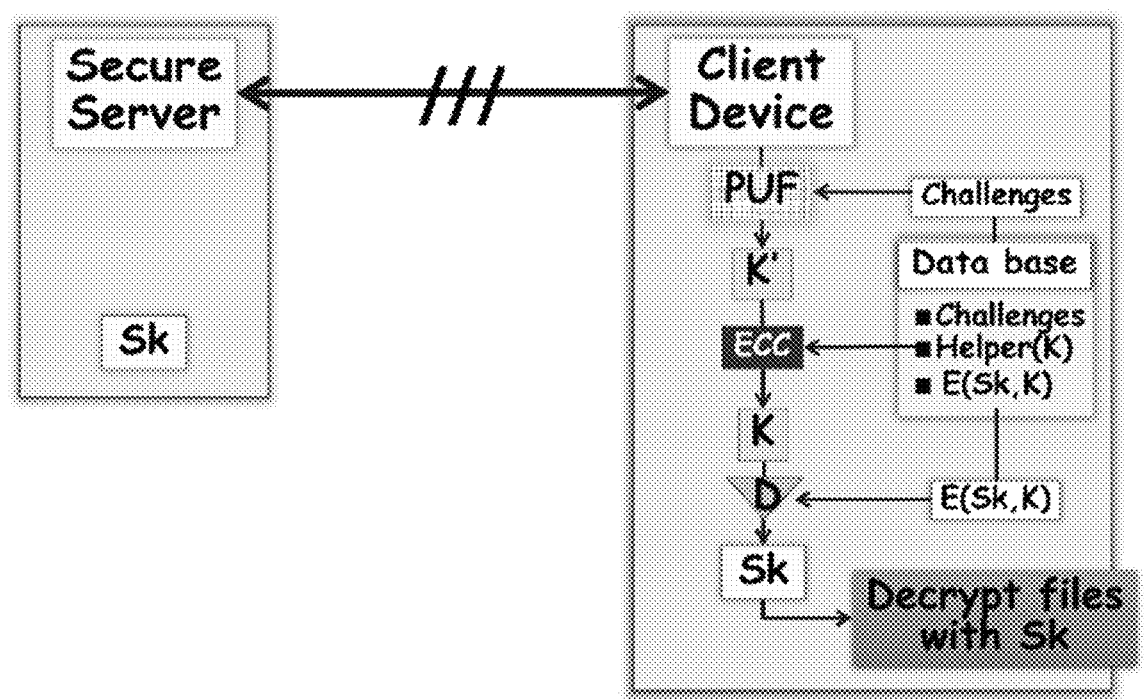
FIG. 4 depicts an arrangement and method for a decryption cycle conducted by a client.

A decryption cycle protocol is shown in FIG. 4. The goal of the decryption protocol is decryption of the session key Sk, which allows for decryption of any files encrypted with the session key and for secure communication with other devices in possession of Sk. In the arrangement of FIG. 4, the client device may recover Sk on its own, without any further communication with server. The first step of the decryption cycle is retrieve the challenges from memory and to generate the PUF responses K' from the challenges stored by the client device. For the reasons of drift (e.g., temperature changes), measurement errors, manufacturing defects and erratic cells, the K' responses usually differ from K due to bit error rates (BERs) that can be as high as 10% for generic PUFs. The client may use an ECC engine and the stored helper data to find the original responses K, from K' and from the data helper. Other methods to correct K' such that it is equal to K may also be employed. For example, as part of generating the helper data, the client may subject K to a one-way cryptographic function (e.g., a hash), and then store the result. To recover K later, the client may generate K' (the second measured PUF responses), subject K' to the same one-way cryptographic function, and then compare the first and the second hashes. K' can then be iteratively perturbed (e.g., by bit-flipping), hashed, and compared to the original hash until a perturbed version of K' is uncovered that generates the same hash.

Once the original K has been recovered from K', it may be used to decrypt the cipher text E(Sk,K), allowing for the recovery of the session key Sk. This enables the decryption of the digital files encrypted with Sk, and it allows for further exchange of messages encrypted with Sk with devices that have their own copies of Sk (e.g., the server).

In another embodiment, rather than using PUF responses to encrypt the session key, the PUF responses K, or some encryption key generated by an encryption algorithm on the basis of K, is used to encrypt digital files for storage. In such cases, the server may generate its own copy of K from an enrolled image of the PUF. The server may then pass the challenge message (e.g., PUF addresses), helper instructions and masking data for erratic cells to the client. The client may then measure the PUF on the basis of the instructions in the challenge message, resulting in a response bitstream K'. That response bitstream would be corrected to K on the basis of application of the helper data, or one of the other methods discussed above. K' would then be used to encrypt digital files for storage. K' would then be deleted. For future decryption cycles, a second set of responses on the basis of the same challenge message (which the client stored) would be generated, K". This response stream would again be corrected to K and used for decryption and communication with the server.

The encryption and file storage methods discussed involve storage of, at least, challenges, helper data and masking data, and ciphertext in memory at the client. To enhance security of these methods of protecting digital files with PUFs, memory structures and read-write methods will now be described that enable the stored data to be erased as part of the read cycle. Since ReRAMs operating in the pre-formed range are excellent tamper resistant PUFs, security can be enhanced by having program-read-erase capabilities directly within a ReRAM, and preferrably, the same unitary ReRAM that is being used for response generation. In such an arrangement, the challenges are stored within an array of pre-formed ReRAM cells, and the responses can be generated without exposing the challenges outside the integrated device. After the fact probing of the memory array is expected to be fruitless, as information is erased, and the cells permanently damaged. ReRAM and similar elements usable for various aspects of the invention will now be discussed.

ReRAM devices used as memory rely on the formation of temporary, dissolvable or stable but breakable conductive paths through otherwise insulting dielectric material to store a logic state. Such memory elements include conductive bridge RAMs (CBRAM), memristors, and resistive random access memories (ReRAMs), any of which may be used herein. In addition to serving as memories, these memory elements may be used to generate PUFs capable of supporting the secure communications methods discussed above. ReRAMs are normally used to store digital memory bits with a high resistance state (HRS) indicating one digital value and a low resistance state (LRS) indicating the opposite digital value. Conventionally, pre-formed ReRAM cells comprise two electrodes: a first electrode including active metallic material such as Cu, Ag, Ta, Al or Ti, and a second electrode include a passive metallic material such as W or Pt. The electrodes are arranged on either side of a dielectric material. Before ReRAM devices can be used as a conventional digital memory device, the devices must be formed. This process involves application of a voltage across the device that is higher than some critical device threshold. When such a voltage is applied, cations (e.g., Cu or other active metal ions) migrate from the first (active) electrode into the dielectric material to form one or more essentially permanent, but breakable or dissolvable, conductive paths (e.g., conductive filaments). After the conductive filaments of a formed ReRAM cell are built, the resistance of the devices is very low, on the order of several KΩ.

In contrast, pristine (i.e., unformed) ReRAM cells have extremely high resistance values, typically higher than 100 MC. The forming process triggers an avalanche effect of the cations to form conductive filaments by ramping up the voltage across the top electrodes and bottom electrodes of each cell. The formation of these filaments results in a ReRAM cell having a low resistance state (LRS), which is typically around 5 KΩ. During a setting operation, one or more of the formed conductive paths may be broken or otherwise rendered discontinuous, resulting in the cell having a high resistance state (HRS), typically around 20 KΩ. This setting process writes a digital value to the cell. Importantly, a formed ReRAM that has been set to its HRS still has partial conductive filaments formed through the dielectric, but these partial filaments are discontinuous (i.e., they do not connect the anode and cathode). This setting or filament breaking process is reversible through a resetting operation, which rebuilds or completes the filament, connecting anode and cathode, resulting in a LRS In this operation, the opposite digital value has been written to the cell. These operations enable the cell to be switched between its LRS and its FRS state to store one of two binary values.

The forming process is irreversible, which is to say, that the conductive paths created by the forming process may be broken (i.e., made discontinuous), but never completely removed. There remain portions of the conductive filaments, arranged at the top and bottom of the device next to the electrodes, even when the device is in the HRS. Thus, once continuous ion filaments form in the dielectric, the electrical resistance of the device is permanently lowered by several orders of magnitude from the very high resistance of the pristine unformed device, to the relatively lower (but still higher than the LRS) resistance of the formed devices' HRS.

ReRAM arrays that have not been subject to the initial forming process (i.e., "pristine" or "unformed" cells) are usable as PUFs for cryptographic applications. Such applications are described in co-owned U.S. Patent Publication No. 2022/0044727, which is incorporated by reference herein in its entirety for all purposes. As is set forth in that application, a physical response of unformed cells may be measured by injection of small currents during challenge-response cycles to generate cryptographic keys. When injected with currents in the approximate range of 1 nA to 1 μA, the resistance values of the cells drop from the 100 MΩ range to the 0.1 MΩ to 20 MΩ range After measurement, the resistance values return to the original high resistance values of the pristine states (typically 100 MC or higher) Thus, the resistance of the cells measurable with small current injection is ephemeral and reversible. It is understood that probe currents at these low levels (sub microamp) do not result in any permanent filament formation, even incomplete filament formation, and whatever organization of the migrating ions occurs during the application of these low current levels is reversed when the current stops. Thus, when operated in this low current (and correspondingly low voltage) domain, the pristine cells remain pristine, and do not exhibit any permanent change, as they do when subjected to the higher voltages and currents used during the forming process, and during the conventional set/reset process for formed ReRAM cells.

Unformed ReRAM cells have certain advantages making them particularly well suited for PUF generation First, the unformed resistance of each ReRAM cell in a memory array is unique to that cell and depends on the number, location, and density of defects within the dielectric layer along with the precise thickness and area of the top electrode and the bottom electrode. All of these parameters vary from cell to cell and device to device due to manufacturing variations. Accordingly, ReRAM based PUFs have significant and random cell to cell variation in resistance, which means that each device has a unique digital "fingerprint", i.e., the distribution of resistances across the array at one or more injection current values. Typically, inter-PUF (i.e., inter-cell) standard variations are in the 50% range of the median values.

Additionally, ReRAM based PUFs exhibit large intra-PUF (i.e., intra-cell) variations when the cells are subject to various injected currents. When the current applied to any given cell varies from 100 nA to 800 nA, the resistance typically drops by a large factor (for example, 4 times). However, each cell will typically behave differently from the others when the injected current varies. Thus, a cryptographic key (i.e., a set of PUF responses or measurements) generated at 100 nA is different than a key generated at 800 nA because the respective order in the resistance values of the cells changes with injection current.

The cell-to-cell resistance variability combined with the property of each cell having a different resistance as a function of injected current greatly expands the number of keys that can be generated from a single ReRAM-based PUF Different measurements of arrays of cells may be taken with a single current value for all cells to generate a key. Other keys may be generated using the same or different cells measured at a different current value. Other keys may be generated by measuring different cells with different current values, or the same cell with different current values.

At the same time, the unformed resistance of a particular ReRAM cell at a particular low level of injection current is significantly repeatable. When unformed cells are subjected to repetitive testing at the same current/temperature conditions, the resistance values are stable with a small amount of variation. Typically, the intra-PUF relative standard variations are less than 10% of the median resistance values.

The storage arrangement and methodologies that will be described involve the operation of ReRAM cells in a middle domain between pristine cells (having resistances in the MΩ range) and formed cells having resistances in the low KS range (e.g., 1-50 KΩ range, with most being between 5-20 KΩ range). ReRAMs that are subject to a partial forming cycle will demonstrate resistances in the range of hundreds of KΩ (e g, 100-500 KΩ). These are devices that have been subjected to a lower voltage ramp than would be used during a forming cycle. When the voltage of the cells is ramped to a lower voltage, or for a short amount of time, the conductive filament formation process begins, but the filaments do not completely bridge the electrodes. In this middle domain, the partial filaments are permanent, i.e., they do not dissolve when the applied voltage is removed. In certain embodiments, devices that have been conditioned in this manner may act as one-time programing (OTP) memory, as well as the devices subjected to full forming cycle. In both domains, the resistances of partially formed devices are distinct enough to be recognizable, and stable relative to pristine devices, and the same is true of the resistances of fully formed devices as to partially formed devices.

Figure 5:
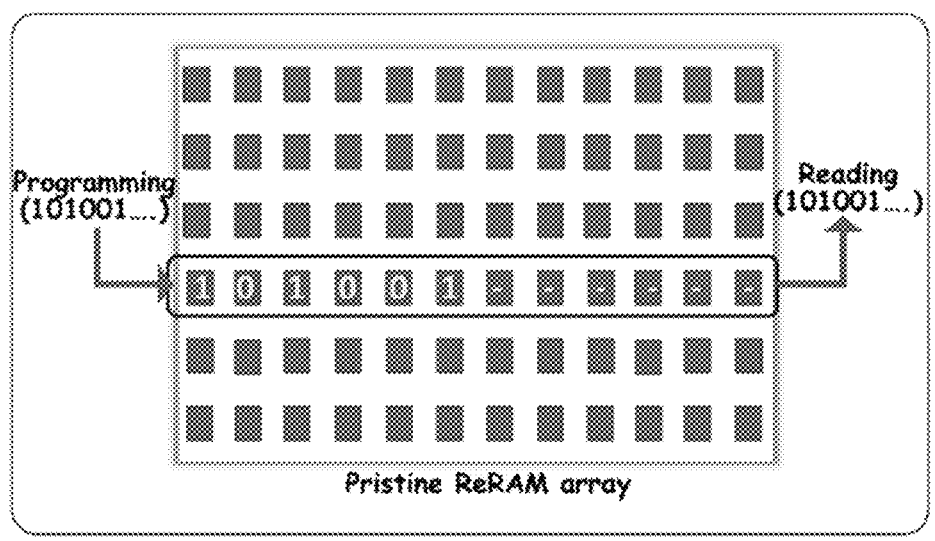
FIG. 5 schematically depicts storage of a data word in an array of partially formed ReRAM devices.
Figure 6:
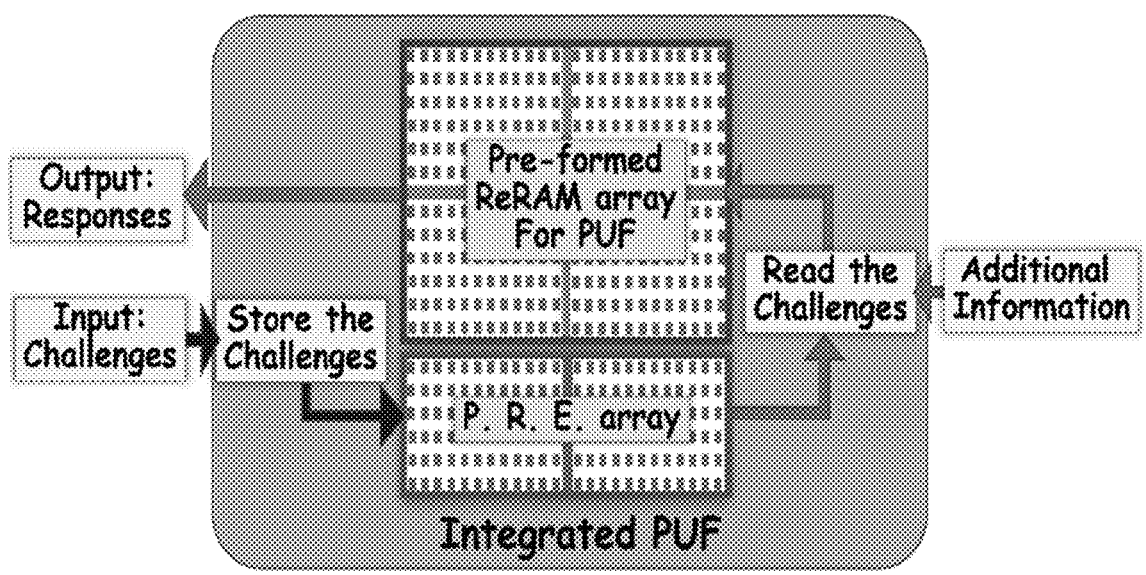
FIG. 6 is a schematic diagram of an arrangement of a subdivided ReRAM array including both PUR and Program-Read-Erase (PRE) operations.

Referring now to FIG. 6, there is shown in a schematic environment a ReRAM array that has been divided such that one portion acts as a PUF to generate responses, and another portion acts as a memory. The PUF portion of the array ("Pre-formed ReRAM Array For PUF") is an addressable array of ReRAM cells that are pristine, i.e., have never been subject to the forming process or any process resulting in the formation of stable or permanent conductive filaments in the dielectric that exist in the absence of any applied voltage or probe current. As is described above, injection of low level probe currents (~1 nA to 1 μA) through these pristine devices will produce unpredictable, but repeatable, resistance values (typically in the one to hundreds of mega ohm range), making them usable for the generation of PUF responses. Another portion of the ReRAM ("P.R.E. array") is used as a memory, rather than or in addition to as a PUF array. In this second portion of the array, at least some cells have been subject to a partial forming cycle, where the resistance of those cells has been permanently lowered by ramping voltage across the cell in a write process which results in the partial formation of a permanent or stable, but incomplete, filaments. An examplary partial formation and programming/write cycle is illustrated in FIG. 5 and detailed further below in reference to FIG. 7. This programming cycle results in the permanent reduction of the resistance of certain cells, which along with pristine cells, may store binary data.

The read cycle, also detailed below, retrieves the information stored in the memory portion of the array while damaging or permanently altering the totality of the pristine cells involved in such a way that they are not readable a second time. As a result of this read process, allcells, regardless whether they were programmed as a "0" or a "1" at the start of the read cycle, are left in a partially formed state, and are indistinguishable from each other, in terms of the binary data their formerly encoded.

While the schematic embodiment of FIG. 6 shows a single ReRAM array that has been divided, such that a first subarray of pristine devices is used as a PUF, and a second subarray of devices (some of which are partially formed) is used as a memory, this is not a requirement. In alternative embodiments of the invention, an array of pristine and partially formed ReRAM cells is used as a memory, e.g., by the client device described above, while the client's PUF is an entirely separate device. Indeed, in these embodiments, the client's PUF need not be a ReRAM-based PUF, but instead may be a PUF based on other technologies, such as static random access memory, dynamic random access memory, electrically erasable programmable read-only memory, one-time programmable memory, an array of ring oscillators, gate delays oscillators, optical physically unclonable functions, and microelectromechanical system physically unclonable functions.

The memory described above may be advantageously used by a computing device (e.g., the client device operating in a hostile environment) to store data usable by the client device to generate or recover an encryption key such as the session key Sk described above. In particular, the challenge message received by the client including the challenges (PUF addresses) with other instructions (e.g., masking instructions, helper data, etc.) that are needed to generate responses from the PUF may be stored in the partially formed array for future use (such as for use during the decryption cycle described above). In these embodiments, when a client device begins the process of recovering a key (e.g., Sk,), for example, in response to a communication request from the server or to decrypt a document encrypted with the key, the client may retrieve the challenges stored in the partially-formed ReRAM memory. Those challenges may then be used by the client's APG to measure the integrated PUF (i.e., the PUF portion of the array) to generate responses. The advantage to using a single subdivided ReRAM array in this matter is that the response retrieval process may be executed by the client without exposure of the challenges or other information outside the device.

As an optional enhancement, the read or data retrieval process for the memory portion of the ReRAM PUF may be designed in such a way that the read process is destructive and erases the read data as it is being read by permanently altering the cells on which that data is stored. In these embodiments, after completion of the response generation cycle, the challenge information (challenges, erratic cell masking data, helpers, etc.) is gone, and the device cannot generate the same response without receiving the same set of challenges and instructions (i.e., in a new challenge message from the server). The request to generate responses can also be associated with the delivery of additional secret information, in such a way that the in-PUF computing element cannot operate without this information. Some examples of additional secret information include passwords, access codes, and identity modules that are intended to be used only once, then discarded. Such an architecture is intended to provide unique layers of security when operating in a low trust environment, mitigating a range of possible vulnerabilities. As needed, a portion of the array can also be fully formed and used as a traditional non-volatile ReRAM device to store the information that is not sensitive. The ReRAM devices are usually fabricated with mainstream CMOS technologies, further enabling a comprehensive integration of the security modules required for in-PUF computing.

Figure 7:
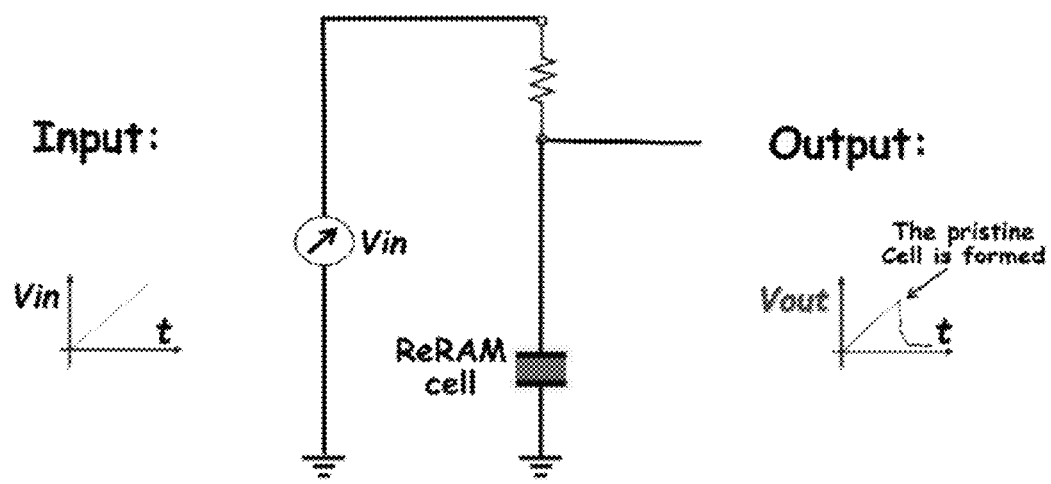
FIG. 7 schematically depicts a circuit usable to write data to a pristine ReRAM by partial formation.

FIG. 7 illustrates a schematic arrangement for programming ReRAM memory cells operating in the partially formed domain. As shown, a variable voltage is applied through a voltage divider circuit to a pristine ReRAM cell. During programming, the voltage applied to a cell is ramped from 0 to 2V over the course of 100 ns. This causes partial, but incomplete, conductive filament formation, which results in reliable, permanent reduction in he resistance of the cells to the low hundreds of K$\Omega$ range. This low resistance value is quite easily distinguishable from the ~1 to 100 M$\Omega$ resistance of pristine cells. Partially forming a cell writes a logical "0" to the cell. The programming of pristine ReRAM cells according to this method is not as demanding, in terms of voltage and power requirements, as the forming cycles of generic ReRAMs operating in the set/reset mode. The forming of the cells to prepare traditional ReRAM devices for the set/reset operations must reduce the resistances to a much lower range, typically around 10 k$\Omega$. By contrast, the programming of a "0" in this novel scheme is already successful when the resistance of the cells has been reduced enough to reliably stay low enough, typically below 200 k$\Omega$. Therefore, a window of programming such as 0 to 200 K$\Omega$ is good enough to assign a logical "0" as the non-programmed cells, the "1"s, are kept in the pristine state with resistance values in the high tens to 100 s of mega ohms.

During the programming/partial forming process, the voltage across a particular cell abruptly drops, as shown in the voltage v. time diagram FIG. 7. Programming is completed when the resistance drops (when subject to a probe current in the 1 nA to 1 microamp range) into the target range, which may be set by any resistance in the hundreds of K$\Omega$, e.g., below 500 K$\Omega$, below 400 K$\Omega$, below 200 K$\Omega$, etc. These ranges indicate partial forming of a conductive filament of cations—an irreversible process. The voltage ramp may be tuned (in terms of slope and peak voltage) in order to achieve the desired middle range resistance (i.e., low hundreds of kilo ohms) indicative of partial, but permanent, conductive path formation. Different ReRAM devices would be expected to have different requirements. The only requirement is that the voltage on the devices be ramped to a level sufficient to cause permanent, partial conductive filament formation such that the resistance drops to a level where it is reliably distinguishable from the high resistance characteristic of pristine cells. Various oxygen-based ReRAM and Conductive Bridging RAM technologies have different cations involved, such as oxygen vacancies, and metallic ions, and cells have different geometries, so the exact voltages required can be expected to vary. The methods and arrangements described in the instant disclosure were experimentally validated with a range of technologies based on oxygen vacancies using CuO and HfO dielectric, as well as CBRAMs with Al, Ag, and Cu metallic ions.

Figure 8:
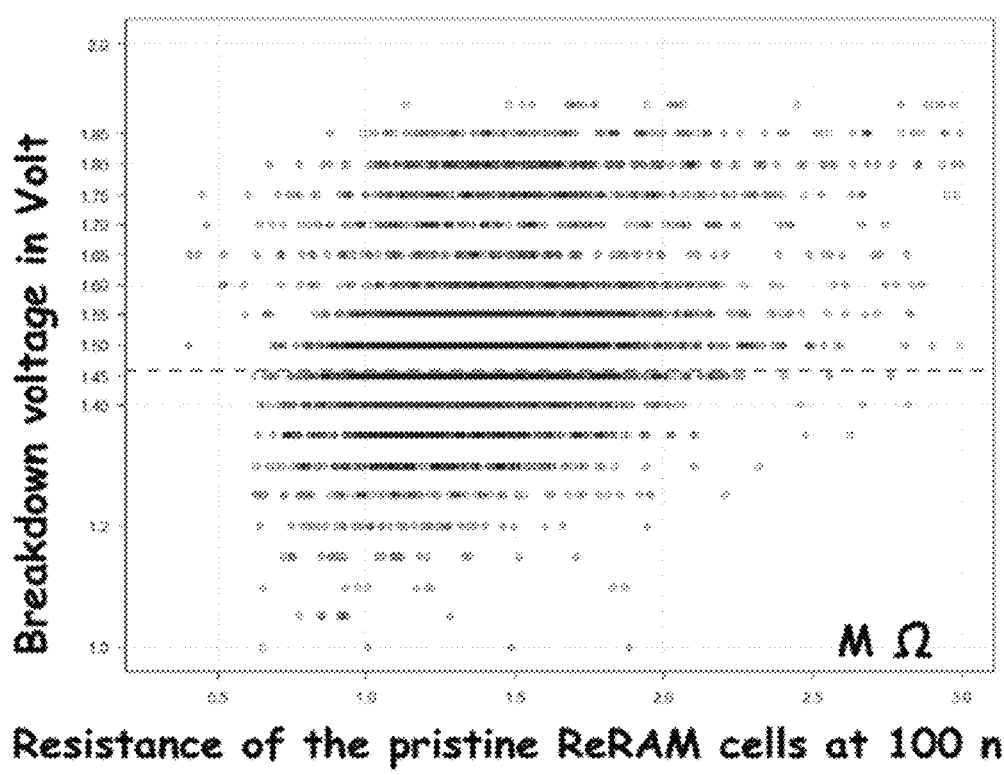
FIG. 8 depicts a characterization of a ReRAM array wherein the Y-axis shows the voltage needed to partially form a cell and the X-axis shows the resistance of each cell measured at low current, 100 nA before forming.

In FIG. 8, the voltage needed to program a ReRAM array with more than 1,000 cells is shown. All cells were successfully programmed between 1.0 and 1.9 volts. The cells with a low resistance value, measured at 100 nA prior to the programming operation, trend to need lower voltage, most likely because their active area is either thinner or exposed to a higher electric field. Such a behavior is well described by a breakdown voltage model in which the voltage reaches the threshold value that creates an avalanche effect and forms conductive filaments of cations. The programming operation is as expected easier to perform than a traditional forming operation that occurs in the 2.0 to 2.5 volt range.

Figure 9:
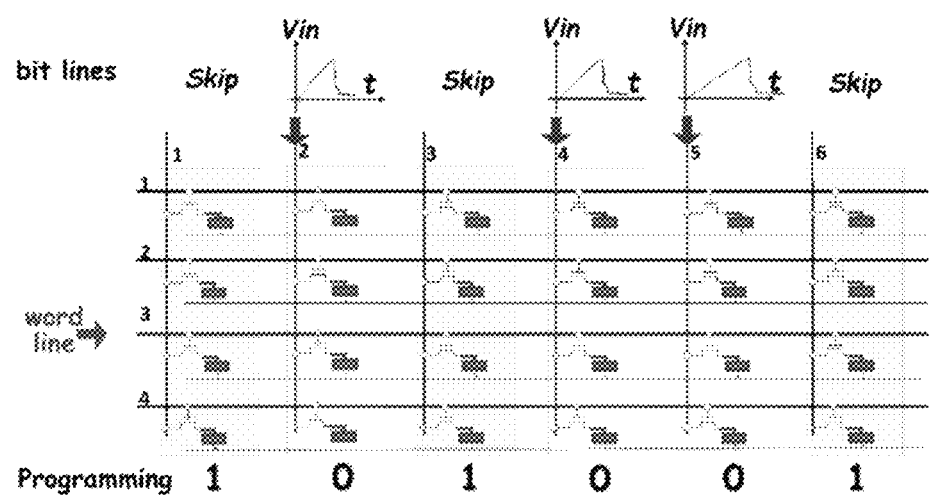
FIG. 9 depicts an exemplary programming cycle for a partially formed ReRAM memory.

To better explain how the programming of an array works, a small example is described in FIG. 9. The programming of a stream (101001) in the word line 3 of an array of 4×6 ReRAM cells is done in the following way: The bit lines 1, 3, and 6 are ignored. The corresponding cells stay pristine with high resistance values, typically in the 0.5 to 3.0 MΩ when 100 nA is injected. The voltage ramp described above, up to 2 volts, is applied in the bit lines 2, 4, and 6. These cells are partially formed, resulting in a lower resistance value below 200 kΩ.

Such an operation is reliable when all the cells are in good pristine condition before programming, and when the voltage applied to the cells which need to be programmed at the "0" state is high enough to form a permanent, but partial, conductive filament of cation. The existing ReRAM technologies are usually optimized to be able to behave in this manner, therefore no changes are required to perform such a programming operation. The stream (101001) stays permanently stored in the array. As will be now discussed, in optional embodiments, the stored data may be read in a manner that destroys the data, making the partial conductive filament ReRAM memory behave as a one-time programming (OTP) device.

Figure 10:
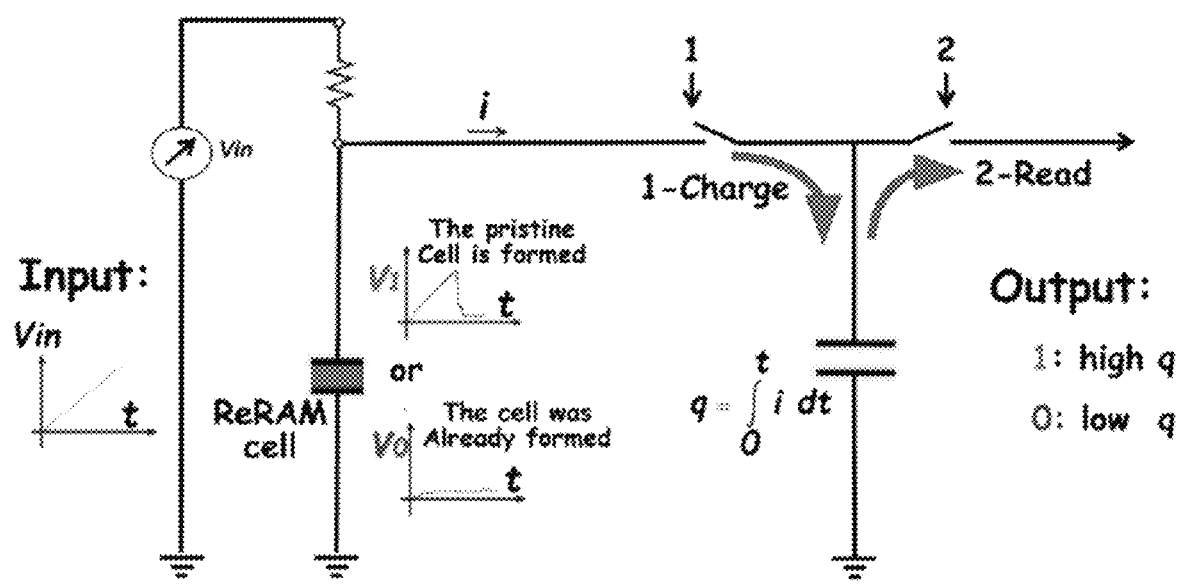
FIG. 10 schematically depicts a circuit usable to read data from a partially formed ReRAM memory while erasing the stored data.

FIG. 10 is a schematic diagram showing an arrangement for destructive reading of a partially formed ReRAM memory. The destructive read is done in two steps. The first step is similar to the programming state: a voltage is gradually ramped to form the cell addressed in the operation. At the end of the cycle, all cells including the "0"s and the "1"s are partially formed with resistance value below a target resistance, e.g., below 500, 400, 200 kΩ, etc. A resistor is used as a voltage divider with the capacitor, and a switch connects a capacitor in parallel with the ReRAM cell during the partial forming process that is conducted during the read cycle. For a cell that has already been partially formed during the programming cycle, voltage drop across the ReRAM cell is relatively low relative to the resistor, because the ReRAM cell has a relatively high resistance. Accordingly, the capacitor, which sees the same voltage as the ReRAM cell, collects less charge during the read cycle as compared with a capacitor in parallel with a cell that started the read cycle in its pristine state. Assuming that a load of 400 kΩ is inserted in series with the cell, the bulk of the voltage is applied across a pristine cell, and therefore the voltage across the parallel arranged capacitor is also high. As a result, the capacitor gradually accumulates charge as the pristine cell is being partially formed. For an already formed cell, with resistance that is already below 200 kΩ, most of the voltage is across the resistor, the voltage across the capacitor is lower, and the capacitor accumulates less charge during the read cycle.

After this cycle, the first switch disconnects the capacitor's connection with the cell, and a second switch connects the capacitor with the read circuitry. The read circuitry generates a "0" when the charge across the capacitor is low and a "1" when the charge is high. A differential circuitry, such as the ones designed for DRAM, can reduce the bit error rates. Some differential measurement arrangements (where the charge level is compared to some reference level) are described further below. There is no need to accurately measure the amount of electric charge; the only information requested is binary.

Figure 11:
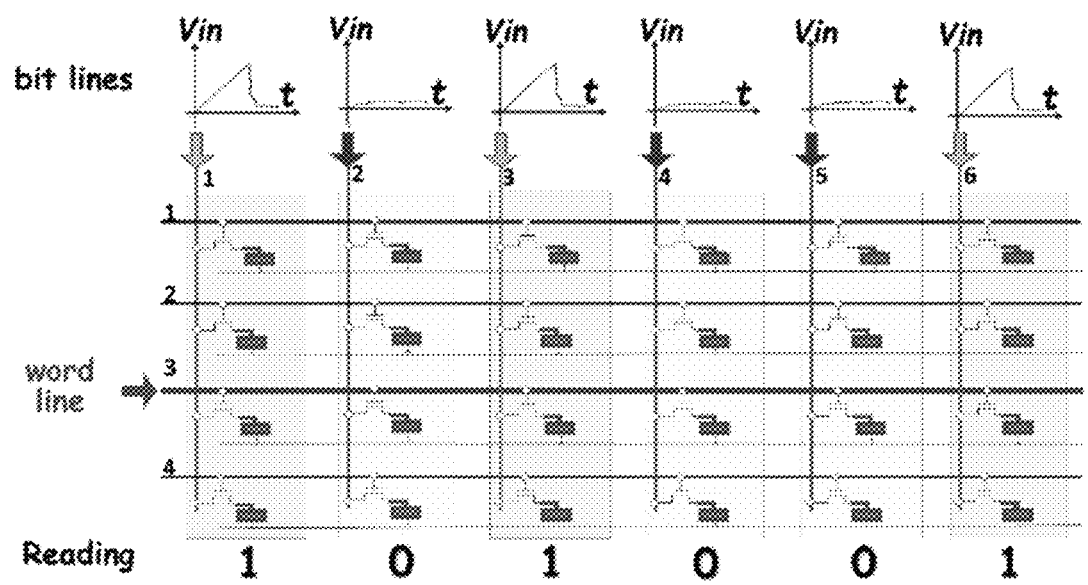
FIG. 11 schematically depicts an arrangement for reading data from a partially formed ReRAM memory array.

The read-erase cycle of a stream (101001) in the word line 3 of an array of 4×6 ReRAM cells is illustrated in FIG. 11. All bit lines 1 to 6 are sequentially addressed with the ramping of the voltage, as presented above in FIG. 10. Through the process, the cells previously formed during programming cycle with low resistance values, corresponding to bit lines 2, 4, and 5, are read again as "0s". Their resistance values post read cycle stay unchanged below 200 kΩ. Through the same process, the pristine cells with high resistance values, corresponding to bit lines 1, 3 and 6, are read gain as "1s". Post read, they also become formed with resistance values post read below 200 kΩ. The resistance values of all bit lines 1 to 6 post reading cycle are not distinguishable from each other, all below 200 kΩ. The stream (101001) is not readable anymore after completion of the operation.

Such a read-erase operation requires that the read cycles properly differentiate the high and low charges stored in the capacitors. Additionally, the voltage ramps applied to the cells should to be strong enough to form a permanent, but incomplete, conductive filament of cation bit lines 2, 4, to 5.

The destructive read method and arrangement described above relies on moving all the read cells into the "partial formation" domain discussed above, such that the previously stored information is no longer readable (i.e., such that previous partially form cells are indistinguishable from previous pristine cells). Other methods may accomplish this same effect. For example, rather than reading the cells, first, by ramping a partial formation voltage across the cells (i.e., to below 2V), the cells could be subject to voltages typical of a conventional forming cycle (i.e., 2 to 2.5V or above). The result would be a conventional ReRAM after the read process, but in this case too, the previously stored data would be destroyed. As stated above, the desirable outcome of such a destructive read is to make all cells looking similar to each other, thereby making the previously partially formed cells indistinguishable from the previously pristine cells that are now partially formed.

In either case, the array that has been read may continue to be used for storage. In a second write cycle, cells that have been partially formed could be fully formed, and others could remain in their partially formed state, resulting in the encoding of two binary states. A second read cycle could then subject all cells to forming voltages, which would again destroy the data previously written. An array that has been transformed into a conventional ReRAM by subjecting all cells to a forming cycle could also, of course, continue to be used as a memory capable of storing data like challenge instructions, but in this case, the destructive read property would be lost. Accordingly, in certain embodiments, data may be written to a memory-ReRAM in a first write cycle using partial formation encoding, that data may be destructively read in a first read process, data may be written in a second write cycle using full formation encoding, and that data can be destructively read in a second read cycle. These embodiments may advantageously store sensitive information in the memory portion of the ReRAM such as challenges, helpers, and erratic cell masks, and can do so twice, before the ReRAM cells being used have been converted to traditional ReRAM memory cells. At that point, those cells may be dedicated to the storage of less sensitive information (e.g., encrypted files).

In certain embodiments, the portion of the ReRAM dedicated for use as memory is segmented into sub-arrays, such that multiple sets of challenge instructions, helpers, masking data may be stored, simultaneously or over time, where each set of instructions is retrievable only once. And again, according to the arrangements described, this can be done twice: once with partially formed cells encoding 0s and pristine cells encoding is, and once with fully formed cells encoding 0s and partially formed cells encoding is. Segmentation of the array allows for the possibility of a client device to be pre-loaded with stored information capable of being used to generate multiple copies of previously used session keys over time, or in response to specific requests from an external device like a server. In other embodiments, portions of the ReRAM dedicated for use as PUF could be allocated for use as memory for the storage of challenge instructions, etc., over time, as the memory portion of the PUF is consumed by one-time use. In these embodiments, it is contemplated that the PUF portion of the ReRAM (which again, is pristine cells), is subdivided into a plurality of sectors or subarrays, the definitions of which are known to both the client and the server. After the memory portion of the PUF is consumed, sectors from the PUF are sequentially taken off line for PUF use and dedicated for use as memory. This would require that challenge messages and instructions omit the addresses of cells in the sectors allocated as memory from key generation, or include the addresses of devices in the deactivated PUF sector in blanking or masking instructions sent to the client.

Figure 12:
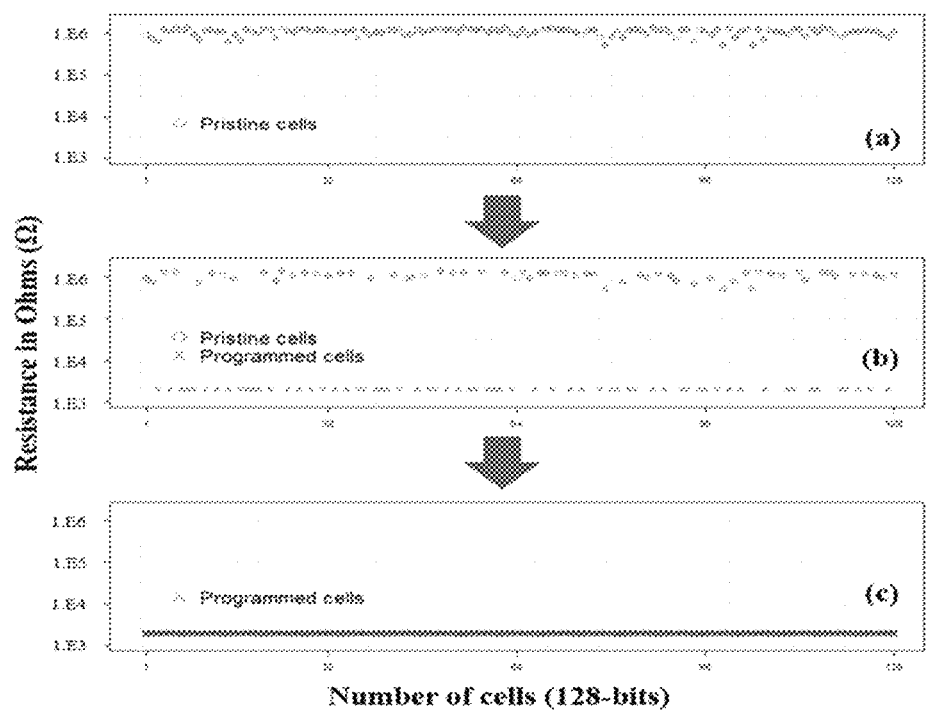
FIG. 12 depicts resistance values of ReRAM cells subject to various programming voltages according to certain embodiments.

The scheme presented previously was tested on 128 pristine cells; the initial resistance values, post programming values, and post destructive read values are shown in FIG. 12.

(a) The initial resistance values of the pristine cells are measured by injecting a current of 100 nA and reading the resistance across the cells. The values oscillate around one mega ohm, and do not drift after repetitive read cycles. The current injected are too small to make any visible changes in resistance. These pristine cells may be used as PUFs, because they generate variable, random, but repeatable resistance values to a given low level probe-current.

(b) A random stream of 128 bits is used to selectively program the cells. Only the cells storing a "0" state are subjected to a voltage ramp which partially form an incomplete conductive filament. The graph (b) is showing the resistances values after programming of the 128 cells subjected to an electric current of 100 nA. The differences between "0" and "1" is clear and reliably stable. The array can then be used as non-volatile memory as it will retain information and be stable when read at low voltage.

(c) In the last portion of FIG. 10, the resistance values of the 128 cells are read after destructive programming cycle. The previously programmed "0"s and "1"s are not distinguishable from each other anymore.

The circuitry described in the program-read-sections of pristine ReRAM arrays, shown in FIGS. 7-10 of this disclosure, are provided as exemplary embodiments and have been validated using proven techniques. Other embodiments replace some of the some of the analog circuitry with analog-digital converters, and digital processing (i.e., to read is and 0s during the destructive read cycle to retrieve challenge instructions). As is suggested above, rather than the challenge data could be encoded in the ReRAM array by fully forming (rather than partially forming) the cells which is mainstream for the ReRAM technology; however, this would result in higher latencies. Again, encoding data in a first write process by partially forming cells, and then encoding data in a second write process by completing the formation process is also possible. In this case, the first read cycle would convert all cells to partially formed cells, and the second read cycle would convert all cells to fully formed cells. This enables two cycles of writes and destructive reads for the same segment of the ReRAM array dedicated as memory.

The basic idea of other methods is to still charge a capacitor to different voltage levels based off the ReRAM devices resistance. This resistance will vary based on a given load that can be fine-tuned based on the ReRAM devices characterization. The ones versus the zeros can be detected with a variety of ways, analog versus digital software approaches. There can also be combinations of both as well.

Analog Hardware Comparison

To expand on the design, a voltage across the capacitor is measured and compared against a "reference voltage" being passed into an operational amplifier (op-amp). The output of this op amp will swing high or low based on the input differences. This is how we can determine a zero vs a one. Reasons to use a hardware compare and output digital logic is it removes any reading of the ReRAM voltage and passing it into software where it is susceptible to various types of attacks. Hardware comparisons will also be faster than software. The "reference voltage" can be a hard-set value that is being generated by various methods (voltage divider with a follower, voltage regulator). Another option is to have the "reference voltage" tunable by implementing a digital to analog converter (DAC). This will allow the voltage being compared against the ReRAM capacitor voltage to be tuned within software.

The output of the op-amp being used to evaluate the comparisons will be digital logic. Either a "1" or "0" will be passed to a digital input and processed within the software suite.

Software Comparison

Software comparisons are implementable but can end up being slower and allow for different types of attacks than hardware but are good for quick prototyping and testing. These comparisons will be done within software based off analog values being passed into an analog to digital converter (ADC). Once the values are passed into the ADC, the software will check if the value is lower or higher than a set software value: When lower output, it is a "0" or formed device, and when higher output, it is a "1" or a pristine device.

A similar idea that involves a DAC can also be used with software compares. The "reference" voltage can be set within software and then read into an ADC which is compared against the analog value coming from the ReRAM device. This is a little redundant since it is possible to just use the method listed above this one and remove the need for a DAC.

The described features, advantages, and characteristics may be combined in any suitable manner in one or more embodiments. One skilled in the relevant art will recognize that the circuit may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrase "in one embodiment," "in an embodiment," and similar language throughout this specification may, but do not necessarily, all refer to the same embodiment.

What is claimed is:

1. A method of managing storage of a first digital file in a client device having an addressable array of physical unclonable function devices ("PUF array"), comprising:
   receiving a challenge message comprising information identifying a set of devices in the PUF array;
   measuring a physical characteristic of at least some of the devices identified in the challenge message resulting in a set of PUF responses;
   using the PUF responses to encrypt the first digital file, and
   storing the encrypted first digital file in a first array of ReRAM devices, at least some of which have been subject to a partial forming cycle,
   wherein data is encoded in the first array of ReRAM devices by encoding a first digital value in a first set of devices by subjecting the first set of devices to a partial forming cycle which creates permanent, but incomplete conductive filaments in a dielectric layer of the device by the application of a voltage insufficient to create complete conductive filaments.

2. The method of claim 1, wherein using the PUF responses to encrypt the digital file comprises using the PUF responses to generate an encryption key.

3. The method of claim 2, wherein the first digital file is a session key, and further comprising using the session key to encrypt a second digital file and storing the encrypted second digital file.

4. The method of claim 1, further comprising storing the challenge message in the first array of ReRAM devices, at least some of which have been subject to a partial forming cycle.

5. The method of claim 1, wherein the challenge message includes helper data usable to correct a measured set of PUF responses corresponding to the devices identified in the challenge message such that the measured set of PUF responses matches a previously measured set of PUF responses for the same devices identified in the challenge message.

6. The method of claim 1, wherein the challenge message includes information identifying erratic devices in the PUF array, and wherein the client excludes identified erratic devices from the set of PUF responses when using the PUF responses to encrypt the first digital file.

7. The method of claim 1, wherein the partial forming cycle reduces the resistance of devices subject to the partial forming cycle from a first value to a second value below 500 KΩ when measured with a probe current having a value within the range of 1 nanoamp to 1 microamp.

8. The method of claim 1, wherein the PUF array is a second array of ReRAM devices, which are pristine, and wherein measuring a physical characteristic of at least some of the devices in the PUF array comprises determining a resistance of the devices when the devices are subject to a probe current in the range of 1 nanoamp to 1 microamp.

9. The method of claim 7, wherein the first and second arrays of ReRAM devices are provided within the same ReRAM array.

10. The method of claim 1, further comprising reading the encrypted first digital file from the first array of ReRAM devices by a read process that partially forms all cells that are read.

11. The method of claim 10, wherein the read process comprises detecting a measure of voltage applied to a cell over the course of a read cycle through a voltage divider circuit.

12. The method of claim 11, wherein detecting a measure of voltage applied to a cell over the course of a read cycle comprises measuring charge accumulated by a capacitor arranged in parallel with the cell during the read cycle.

13. A computing device comprising:
   addressable array of physical unclonable function devices ("PUF array");
   a processor coupled to the PUF;
   a first memory comprising an addressable array of ReRAM devices encoding a first digital value in a set of partially formed devices and a second digital value in a set of pristine devices, and a second memory encoding computable executable instructions operable to cause the processor to:
      receive a challenge message comprising challenge instructions identifying a set of individual device addresses in the PUF array;
      measure a physical characteristic of at least some of the devices having addresses identified by the challenge message, resulting in a first set of PUF responses;
      use the set of PUF responses as or as the basis of an encryption key and encrypt a first digital file using the encryption key;
      store the encrypted digital file in one of the first or second memory;
      store the challenge instructions in the first memory.

14. The device of claim 13, wherein the second memory encodes computable executable instructions operable to cause the processor to:
   read the challenge instructions form the second memory by a first read process, at the end of which, all read cells are partially formed.

15. The device of claim 14, wherein the second memory encodes computable executable instructions operable to cause the processor to store a second digital file to the second memory, by a write process that encodes a first digital value in a set of formed formed devices and a second digital value in a set of partially formed devices.

16. The device of claim 14, wherein the second memory encodes computable executable instructions operable to cause the processor to:
   use the retrieved challenge instructions to generate a second set of PUF responses;
   derive a copy of the encryption key; and
   decrypt the encrypted digital file.

17. The device of claim 13, wherein the PUF array is an addressable array of pristine ReRAM devices.

18. The device of claim 17, wherein the first memory is a sector of the PUF array.

19. An electronic memory device comprising an array of addressable ReRAM devices encoding a first digital value in a set of partially formed devices and a second digital value in a set of pristine devices, the partially formed devices having been subject to a partial forming cycle comprising ramping a voltage across a plurality of devices sufficient to create permanent, but discontinuous conductive filament formation sufficient to lower the resistance of such devices from a first resistance value to a second resistance of value of below 500 KΩ when measured with a probe current having a value within the range of 1 nanoamp to 1 microamp.

* * * * *